July 19, 1960

C. J. COBERLY 2,945,905

PROCESS OF AND APPARATUS FOR GAS PHASE
PYROLYSIS OF LIQUID HYDROCARBONS

Filed June 11, 1956

INVENTOR.
CLARENCE J. COBERLY

BY HIS ATTORNEYS.
HARRIS, KIECH, FOSTER & HARRIS

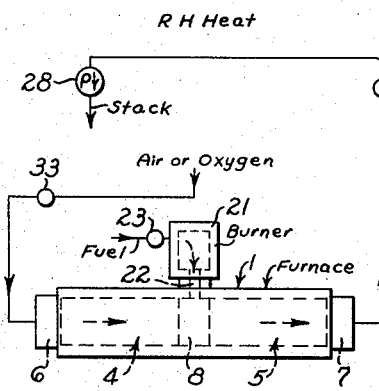
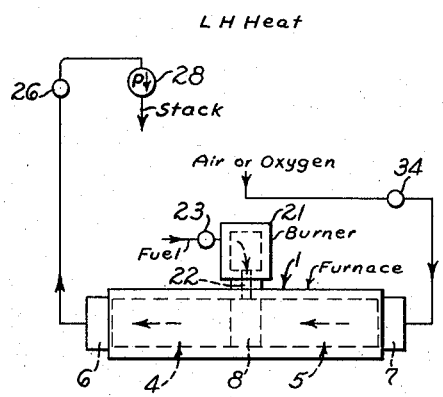
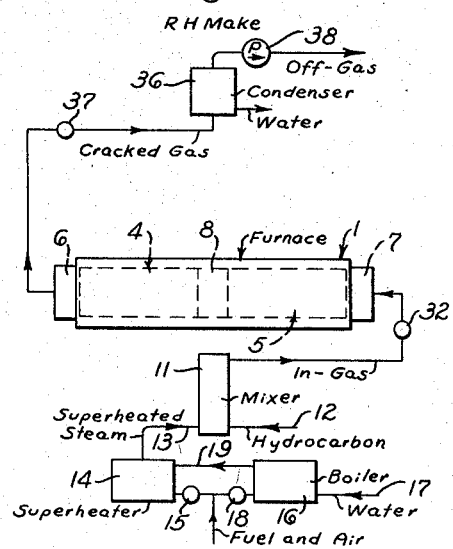
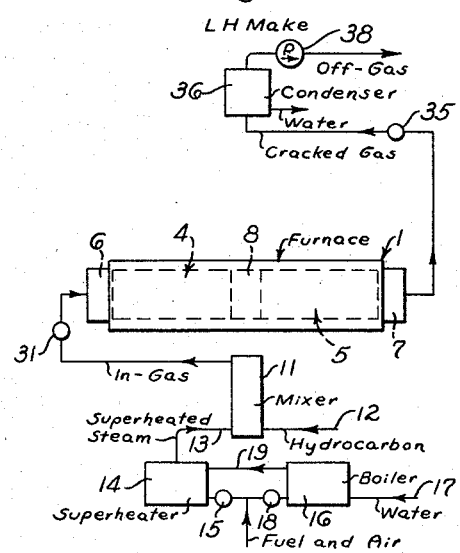
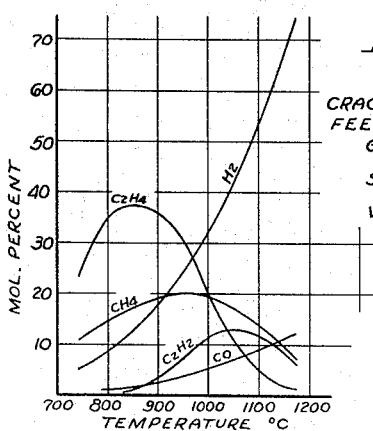

United States Patent Office 2,945,905
Patented July 19, 1960

2,945,905
PROCESS OF AND APPARATUS FOR GAS PHASE PYROLYSIS OF LIQUID HYDROCARBONS

Clarence J. Coberly, San Marino, Calif., assignor to Wulff Process Company, Huntington Park, Calif., a corporation of California Filed June 11, 1956, Ser. No. 590,680

1 Claim. (Cl. 260—679)

The nature and the substance of the invention claimed herein may be summarized as relating to a process by which an in-gas containing the vapor of a suitable liquid hydrocarbon, such as gas oil or other petroleum liquids of high boiling points, is pyrolyzed to produce an off-gas containing a substantial proportion of a desired hydrocarbon, such as acetylene, ethylene, or other unsaturated hydrocarbon.

More explicitly, the invention relates to a process in which an in-gas, consisting largely of superheated steam and containing a gas formed by the vaporization of a suitable hydrocarbon which is liquid at atmospheric temperatures and pressures, is passed through channels in a previously heated regenerative mass with a temperature profile having the highest temperature at the mid-point of the mass with the lowest temperature at the two ends with substantially straight line gradient from the high temperature zone to the ends of the mass, in which the lowest temperature is above the dew point of the vapor of the liquid feed and the highest temperature is sufficient to cause the desired pyrolysis of this vapor as the gas mixture passes through said channels.

The terms used in this specification and in the claim may be defined as follows.

The term "suitable hydrocarbon" is defined as a hydrocarbon or mixture of hydrocarbons which is liquid at atmospheric pressure and temperature and which has an average molecular weight between 80 and 400. These may be straight run distillation products from crude oils having a narrow range of boiling points or may be a broad cut, including all the fractions down to the highest boiling point, which may be as high as 900° F. The fractions may be paraffinic, naphthenic or aromatic and usually will be mixtures, depending upon the source of the petroleum. The lowest boiling fractions would probably correspond to pentane, which has a boiling point of 97° F.

Fractions from cracking operations in which the primary product is motor fuel may also be suitable feed.

The term "gas oil" used herein, for convenience of description, is commonly used in industry to designate a petroleum distillate falling within the upper part of the above range and usually in the molecular weight range of 200 to 300.

The term "desired hydrocarbon" is defined as including all those hydrocarbons which are produced from suitable hydrocarbons by pyrolysis of short duration at high temperatures, notably unsaturated hydrocarbons such as acetylene, ethylene, propylene, and the like.

The term "in-gas" is defined as a gas mixture which contains a substantial proportion of a suitable hydrocarbon and which is delivered to a furnace in which at least a portion of said suitable hydrocarbon is converted by pyrolysis into a desired hydrocarbon.

The term "off-gas" is limited to a gas mixture which contains a substantial proportion of the desired hydrocarbon and which is delivered from the described apparatus for use or further processing.

The term "cracked gas" denotes a gas which contains a large proportion of water vapor and a substantial proportion of the desired and other hydrocarbons as well as other gases, for example, $H_2$, $CO$, and $CO_2$.

A substantial proportion of any gas or combination of gases in any gas mixture is a proportion of at least two percent (2%) by weight of the gas or gases in said mixture.

The symbols "RH" and "LH" are used herein for convenience to designate the right hand and left hand portions of the furnace disclosed, respectively, as viewed in the drawings.

In the annexed diagrams, which are for illustrative purposes only:

Fig. 3 is a similar diagram illustrating the apparatus as used in the RH heat step;

Fig. 4 is a similar diagram illustrating the apparatus as used in the RH make step;

Fig. 5 is a similar diagram illustrating the apparatus as used in the LH heat step;

Fig. 6 is a similar diagram illustrating the LH make step; and

Fig. 7 is a graph showing representative results from the use of my invention.

Figure 1:
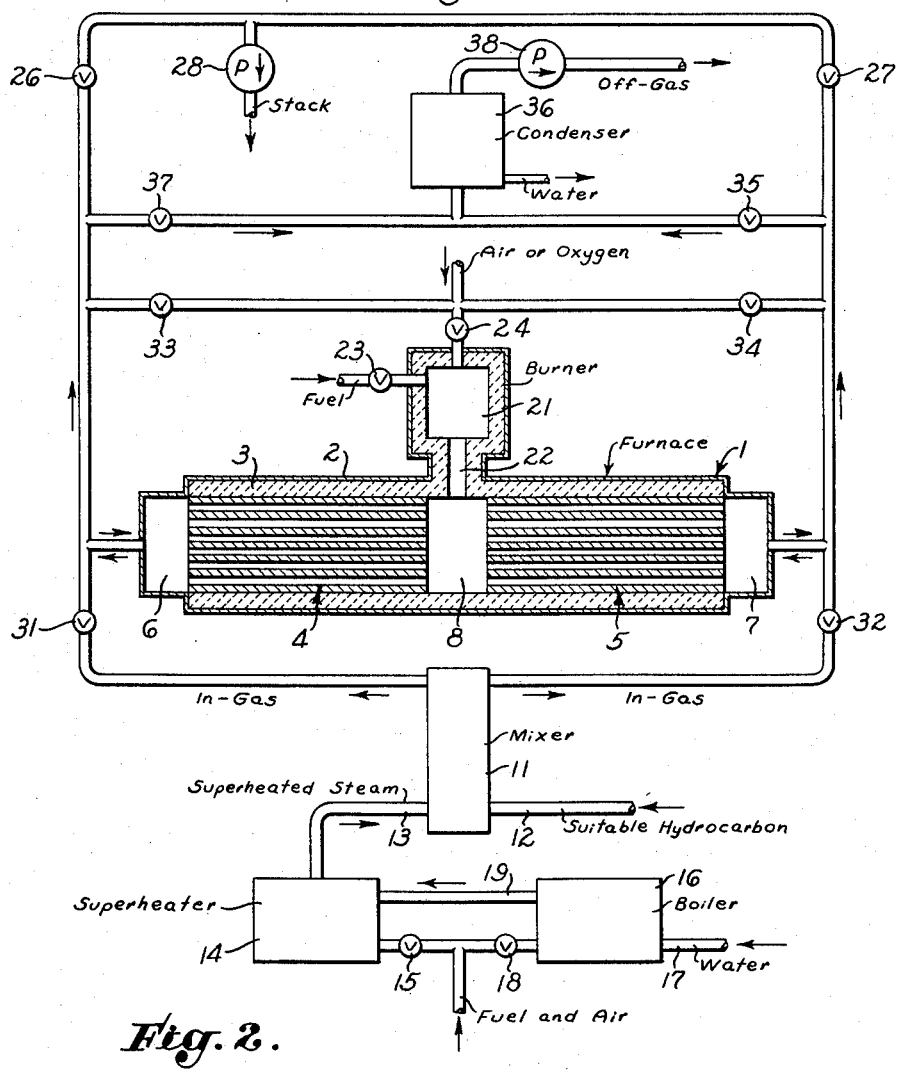
Fig. 1 is a diagrammatic illustration of the apparatus embodying my invention.

The apparatus as illustrated in Fig. 1 consists of a furnace 1 having a gas-tight steel shell 2 with a heat refractory, heat insulating lining 3.

Located inside the lining 3 are a left-hand, or LH, regenerative mass 4 and a right-hand, or RH, regenerative mass 5. These masses provide a left-hand end chamber 6, a right-hand end chamber 7, and a central chamber 8. Each of the masses 4 and 5 has a series of small channels extending longitudinally therethrough to the central chamber 8.

The furnace 1 may be supplied with a suitable hydrocarbon delivered in liquid form to a mixer 11 from a suitable hydrocarbon pipe 12 and superheated steam delivered to the mixer 11 through a superheated steam pipe 13. The superheated steam is delivered to the mixer 11 from a superheater 14 which is supplied with fuel and air through a valve 15 and with saturated steam through a pipe 19 from a boiler 16. The boiler 16 is supplied with water through a pipe 17 and with fuel and air through a valve 18.

The central space 8 of the furnace may be supplied with products of combustion from a burner 21 which is, for convenience in illustrating the apparatus, placed outside the shell 2 although this may not be the preferred arrangement. The interior of the burner 21 where the combustion gases are formed is lined with a suitable heat refractory material and this material extends around a short conduit 22 connecting the inside of the burner 21 to the furnace and forming a path through which products of combustion may be fed into the central space 8. The burner 21 may be supplied with fuel gas through a fuel valve 23 and air may be supplied through an air valve 24.

Products of combustion may be removed from the LH end space 6 through a valve 26 or from the RH end space 7 through a valve 27, the gases of combustion being drawn out of the spaces 6 or 7 and delivered to a stack, not shown, by a pump 28. In-gas from the mixer 11 may be delivered through a valve 31 to the LH end space 6 or through a valve 32 to the RH end space 7. Air may be delivered to the LH end space 6 through a valve 33 or through a valve 34 to the RH end space 7. When the in-gas is passed into the furnace 1 through the valve 31 and from left-to-right through the channels in the masses 4 and 5, and the interior of the furnace is heated to a suitable cracking temperature, a cracked gas is produced which is passed through a valve 35 to a condenser 36. Similarly, in-gas passed from right-to-left through masses 5 and 4 results in a cracked gas which is passed through a valve 37 to the condenser 36. In the condenser 36 water is condensed from the cracked gas to form the desired off-gas. The off-gas is drawn from the condenser 36 by a pump 38 and subjected to such further processing or use as the operator elects. This application does not describe any such subsequent step, being directed solely to the preparation of an off-gas containing a substantial proportion of a desired hydrocarbon.

The process hereinafter described comprises a preliminary heating step and a cyclic process in which four steps are repeated subsequent to the heating step. The steps of the cyclic process are (a) a RH heat, (b) a RH make (c) a LH heat, and (d) a LH make. Alternatively, at the option of the operator, the cycle may be started with (a) the LH step, followed by (b) the LH make step, (c) the RH heat, and (d) the RH make.

Figure 2:
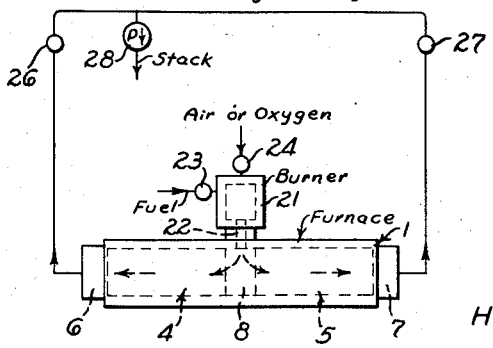
Fig. 2 is a similar diagram illustrating the apparatus as used in the preliminary heating of the apparatus.

That portion, and only that portion, of the apparatus used in preliminary heating is shown in Fig. 2. Fuel oil or gas is delivered through valve 23 and oxygen or air is delivered through a valve 24 to the burner 21 in which a preferably complete combustion occurs. During preliminary heating the products of combustion from the burner 21 are delivered through the conduit 22 to the central space 8 of the furnace, the products of combustion being divided, a portion thereof passing through the RH mass 5 and through the valve 27 to the pump 28, and the remainder of the gas passing through the LH mass 4 and the valve 26 to the pump 28. The pump 28 pulls the products from the interior of the furnace 1 and delivers them to the stack, not shown.

In the preliminary heating step the inner ends of the masses 4 and 5 adjacent to the central space 8 are heated very substantially above the ignition point of the fuel and the outer ends of these masses adjacent to the spaces 6 and 7 are at a much lower temperature. When these conditions are attained, the valves 23, 24, 26 and 27 are closed and the preliminary heating step is stopped. The furnace 1 must be preheated before cyclic operation begins and need not be resumed until the cyclic operation is stopped and the furnace put on stand-by. The burner 21 may be used during stand-by periods during which the cyclic operation is interrupted. During such an interruption, a small fire may be maintained in the burner 21 to keep the masses 4 and 5, or either of them, at sufficiently high temperature to enable cyclic operation to start quickly.

The preliminary heating previously described having been completed, cyclic operation may be started by starting the RH heat step illustrated in Fig. 3.

In the RH heat step air through the valve 33 passes from the LH end space 6 into the central chamber 8, the air being quite hot when it enters the chamber 8 and igniting fuel being delivered to the chamber 8 through the conduit 22 and the valve 23 which has been opened. A combustion, therefore, occurs in the chamber 8 and the products of combustion pass through the RH mass 5 and through the valve 27 into the pump 28 and to the stack. Simultaneously, the LH mass 4 is cooled somewhat by the air delivered to the furnace through the valve 33. The RH mass 5 is further heated by the hot combustion gases passing therethrough, the gases of combustion being cooled somewhat in RH mass 5 before they enter the RH end space 7. The valves 33 and 23 are so regulated as to provide the proper proportion of air and fuel to provide substantially complete combustion and to permit the pump 28 to establish and maintain a substantial vacuum in the central chamber 8 and at the inlet end of the pump 28. The RH heat step shown in Fig. 3 is continued until the inner end of the RH mass 5, adjacent the central chamber 8 is at a temperature considerably above the reaction temperature needed to produce the desired pyrolysis, at which time the valves 23, 27, and 33 are closed, the RH heat step ends, and the RH make step shown in Fig. 4 starts.

It should be noted that the burner 21 acts to produce products to be delivered through the conduit 22 during preliminary heating and thereafter acts merely as a conduit for the fuel between the valve 23 and the conduit 22.

Ordinarily the suitable hydrocarbon employed in the in-gas is one that is liquid at atmospheric pressure and temperature and this liquid is vaporized in the mixer 11. The superheat of the steam supplied to mixer 11 must be sufficient to entirely vaporize the liquid hydrocarbon and produce an in-gas in which the steam is still superheated.

In both the RH and LH make steps steam is produced in the boiler 16 from the water introduced by the pipe 17 and a fuel and air mixture is delivered to the boiler through the valve 18. The saturated steam from the boiler passes the pipe 19 to the superheater 14, from which superheated steam may be delivered to the mixer 11 through the pipe 13. The superheated steam is produced in the superheater by the combustion of an air-fuel mixture delivered through the valve 15 in the presence of saturated steam. The means used to produce superheated steam are conventional and form no part of the invention claimed herein. The superheated steam delivered to the mixer 11 through the pipe 13 is completely and uniformly mixed therein with a suitable hydrocarbon delivered through a pipe 12.

The superheated steam in both the LH and RH make steps performs a triple function, that is, it:

(a) Thoroughly vaporizes the gas oil or other suitable liquid hydrocarbon;

(b) Acts as a diluent to very substantially reduce the partial pressure of vapors of the suitable hydrocarbon;

(c) Supplies sufficient excess heat to said suitable hydrocarbon to prevent any condensation of water or other liquid in the channels of the regenerative masses or in the piping leading thereto.

In the RH make step illustrated in Fig. 4 the in-gas from the mixer 11 passes through the valve 32 into the RH end space 7 and through the masses 5 and 4, respectively, and the valve 37 to the condenser 36. In the RH make step the in-gas is heated to the desired reaction temperature principally during its passage through the RH mass 5, and pyrolysis occurs largely in the RH mass 5 and the central chamber 8, although some pyrolysis may occur in the inner end of the LH mass 4.

In either the RH or LH make step the reaction, which is endothermic, extracts heat units from one or both of the masses 4 or 5 to supply reaction heat and, as the cracked gases so produced continue to travel through the furnace, these gases are cooled by giving up heat to cooler portions of a mass. This cooling continues so that the cracked gas leaving the furnace to the condenser is at a temperature at which the cracked gas is relatively stable. In the RH make step, illustrated in Fig. 4, such cooling occurs principally in the LH mass 4. In either make step the temperature of the cracked gas drops as the step continues in operation due to absorption of heat from the ceramic mass, and the make step is stopped before the reaction temperature drops materially below that required to produce cracked gas of the desired composition. Also, as the step continues the exit temperature increases with a corresponding loss of heat from the unit and with the danger that the desired gases may be decomposed if the make step is continued too long. This is particularly true where $C_2H_2$ is the desired hydrocarbon in the cracked gas as it polymerizes readily and must be rapidly cooled to below 600° C. and preferably to about 400° C. to prevent substantial loss. Thus, the RH make step is stopped at an appropriate time, by closing valves 32 and 37.

The LH heat step illustrated in Fig. 5 is started by opening valves 23, 26, and 34, which sends air into the RH end space 7 through the valve 34 and sends the air through the furnace 1 from right-to-left, fuel being added in the central chamber 8 to produce hot gases of combustion which pass through the LH mass 4 and the valve 26 to the pump 28 and thence to the stack. The LH heat step is continued until the LH mass 4 is raised to the desired cracking temperature.

In the LH make step illustrated in Fig. 6, an in-gas made as previously described passes through the valve 31 into the LH end space 6, then through the masses 4 and 5, respectively, from left-to-right, and through the valve 35 to the condenser 36. In the LH make step pyrolysis of the in-gas occurs chiefly in the hot LH mass 4 and the cracked gas resulting therefrom is cooled to a stabilization temperature during its passage through the cooler RH mass 5.

The LH make step, illustrated in Fig. 6, is followed by the cycle as above described, and the next cycle beginning with an RH heat step illustrated in Fig. 3.

All of the valves above described are capable of manual operation but are preferably operated through a desired sequence of timed steps by suitable automatic timing apparatus, not shown.

In the above description of the cycle of operation of my invention, reference is made to the heating up and cooling down of the ceramic mass and to the hot and cold parts of the mass. These are relative terms only. Actually when the apparatus is up to operating temperature with a normal temperature profile, there is very little change in temperature during the heating or cooling steps of the cycle. The maximum variation will be adjacent to the combustion chamber where high flame temperatures are produced and the heat transfer is rapid. The skin or outer surface of the ceramic may show a considerable temperature swing but the mass of material affected is so small that only an optical pyrometer will measure the change. The average temperature of the mass in the middle of the furnace near the combustion chamber where the ceramic temperature is over 800° C. and where the maximum work is done has been found to change about 30° C. That is the average temperature will rise 30° C. during the heating period and will cool 30° C. during the cracking period when the duration of heat is one minute.

An example of the main characteristics of a furnace well adapted to pyrolyze gas oil to produce ethylene or propylene is as follows.

The two regenerative masses 4 and 5 are approximately 5 feet long and have a cross-section of 18" x 20", each mass having a multiplicity of small cylindrical channels which preferably should be from 1/8" to 1/2" in diameter. The material from which the masses are made is preferably high purity alundum ($Al_2O_3$). Other similar materials may be used if they are highly heat refractory, preferably having high heat conductivity, and if they will successfully resist injury over long periods at temperatures in excess of 3000° F.

The gas oil may have a specific gravity 40° API and an end point of 600° F. Many difficulties exist if it is tried to operate by preheating the gas oil in a coil type preheater in which the coil is heated by combustion gases. Using such gas oil or other relatively heavy liquid feed stocks, I have found that they cannot be sufficiently well atomized by conventional methods to provide optimum yields of desired hydrocarbon.

It has been found that these difficulties can be overcome by preheating the steam to such extent that the feed stock is full vaporized, the superheat of the steam supplying the heat of vaporization of the atomized liquid. It is desirable to preheat the liquid feed stock to at least the temperature corresponding to the dew point of the vapor of the feed stock with its normal steam dilution. The steam in this case only supplies the heat of vaporization. At the operating temperatures required for a 600° F. end point oil with 15" of hg. vacuum and two pounds of steam per pound of oil, at least 350° F. is required. If this amount of preheat is supplied, only about one-half of the total heat in the vapor is supplied by the superheated steam. The amount of superheat required depends on the dilution ratio but with conditions such as the above the steam should be superheated by at least 200° F. above the hydrocarbon dew point of the steam-vapor mixture, so that the reduction in steam superheat will supply all of the heat of vaporization and still be above the dew point.

With very heavy feed stocks it is desirable to atomize the liquid hydrocarbon into the steam at a temperature above the dew point and then pass the steam atomized oil mixture through the superheater, so the superheater can supply the heat of vaporization of the hydrocarbon liquid. In this way the superheater will have the same heat duty but a much more favorable temperature gradient, as the mixture need only be heated to a temperature well above the dew point in place of several hundred degrees above as is the case when the superheat of the steam must supply the heat of evaporation.

It should be pointed out that the length of the mass is critical with liquid feed and particularly that the mass should not be too long. There are two important considerations:

(1) If the sections are too long, the ceramic at the outer ends may be at a temperature which is below the dew point of the feed and hence liquid will condense on the ceramic and oxidize but not burn and form tars which will clog the passages. With the gas oil used in this application as an example, the dew point is 350° F. at one-half atmosphere, or 450° F. at atmospheric pressure. If no steam dilution is used, as might be possible in producing ethylene, then the dew point would be 600° F. To be safe, therefore, the minimum temperature of the ceramic should not be less than the end point temperature of the oil or 600° F.

(2) At the exit end the same consideration must be given to the tars which are in the cracked gas. I have found that ceramic temperatures of 800° F. are adequate to prevent tar condensation.

As a third consideration, if the mass is too short then the heat loss will be excessive.

Whether or not the heat of vaporization is supplied by the steam, it has been found that the reaction must take place in the gas phase and if liquid enters or forms in the ceramic mass tars and carbon may form, tending to clog the passages, which is very undesirable. If, however, the hydrocarbon is always in vapor phase in the apparatus and it is kept at a temperature above the dew point of the hydrocarbon, no significant tar troubles will be experienced.

This procedure is applicable to the production of acetylene, ethylene or mixtures of acetylene and ethylene with the other cracked gas in the off-gas mixture in which acetylene-ethylene ratio may be from 4:1 to 1:40 with very high yields. When producing ethylene, less steam dilution is required than for acetylene (higher partial pressure) and hence it is even more desirable to have the vaporization of the suitable hydrocarbon take place in the superheater, as the dew point temperature will be higher with less steam dilution, and, therefore, the required superheat would go up rapidly due first to the higher dew point and second to the fact that less steam is available to supply the heat of vaporization and, therefore, corresponding greater superheat is required.

I have found that by this means a very wide range of liquid feed stocks may be employed for the production of acetylene and ethylene, which are two important unsaturated gases, and that the cost of such gases can be materially reduced by the use of low cost liquid in place of the more expensive gaseous materials such as methane, ethane, propane, butane, etc. Also, such low cost liquid feed stocks may be stored at atmospheric pressure, which is less expensive than pressure storage of gases and also much less than for gasholder type storage, which would be required if gases are stored at atmospheric pressure. The composition of the cracked gas may be varied over a wide range with good results and with no appreciable trouble resulting from coking or excessive tar formation. It should be noted, however, that the heavier feed stocks produce more tar and oil in the cracked gas than the light material such as methane, ethane and propane.

Fig. 7 graphically gives the composition of the cracked gas with constant partial pressure and approximately constant contact time at various reaction temperatures and resulting from the use of my invention. It should be noted that this figure shows only the principal components and, in evaluating the results, other products are present which may have substantial value. For instance, in the ethylene range, other olefines are present as well as benzol, butadiene, butene and methyl acetylene, which have material by-product value. In the analysis for maximum ethylene concentration, the propylene concentration may be 9.75%, which is a yield of 16.4% or a total olefin yield of 58%. In the acetylene range substantial amounts of ethylene and benzene are also produced. The combined yield of acetylene, ethylene and benzene is 48.1%. In the range for maximum yield of acetylene plus ethylene, the total yield including propylene and benzene is 57.5%. In these figures the yields given are on the basis of carbon in the product divided by carbon in the feed.

The following table shows results obtained from the practice of this invention with the conditions varied in three different tests as indicated in the table:

|  | Case I | Case II | Case III |
|---|---|---|---|
| Feed Gas Oil (g.p.m.) | 0.44 | 0.44 | 0.44 |
| Feed Steam at 212° F. (C.F.M.) | 184 | 277 | 320 |
| Steam Dilution Ratio (by wt.) | 2.34 | 3.50 | 4.04 |
| Temperature _____ ° C__ | 850 | 1045 | 1075 |
| $C_2H_2$ Yield _____ percent__ | 0.5 | 27.2 | 27.2 |
| $C_2H_4$ Yield _____ do____ | 41.6 | 21.4 | 16.6 |
| $C_2H_2+C_2H_4$ Yield _____ do____ | 42.1 | 48.6 | 43.8 |
| Carbon Balance _____ do____ | 92.6 | 92.6 | 81.4 |

The foregoing table shows that good cracking yields can be obtained through a wide range of proportions of superheated steam to gas oil by changing only the cracking temperature. In each case the gas oil had a gravity of 42° API with an initial boiling temperature of 430° F. and an end point of 600° F. In none of the cases set forth in the above table was there any trouble resulting from coking or excessive tar formation.

I claim as my invention:

1. A process of producing an off-gas containing a desired hydrocarbon from an in-gas containing a suitable hydrocarbon, which includes the steps of:

mixing a suitable hydrocarbon which is normally liquid at atmospheric temperatures and pressures, has a molecular weight between 80 and 400, and is in a liquid state, with superheated steam to completely vaporize the suitable hydrocarbon and to form an in-gas having a temperature substantially above the dew point of the suitable hydrocarbon but at a temperature at which substantially no cracking of the suitable hydrocarbon occurs;

conveying the in-gas through piping to a furnace containing a heated regenerative mass, the superheated steam in said in-gas maintaining the in-gas above the dew point of the suitable hydrocarbon therein during such conveyance to prevent the deposition of hydrocarbons in such piping;

passing the in-gas through the heated regenerative mass to crack the suitable hydrocarbon and produce a cracked-gas containing a desired hydrocarbon, tars, and superheated steam;

cooling said cracked gas in the furnace to a temperature at which the desired hydrocarbon therein is stable but above the condensation temperature of said tars;

conveying said cracked gas from said furnace to a condenser and therebetween maintaining the temperature of the cracked gas above the dew point of tars therein; and condensing the steam from said cracked gas to form an off-gas containing the desired hydrocarbon.

References Cited in the file of this patent

UNITED STATES PATENTS

| | | |
|---|---|---|
| 2,113,536 | Grebe et al. | Apr. 5, 1938 |
| 2,520,149 | Keeling | Aug. 29, 1950 |
| 2,572,664 | Robinson | Oct. 23, 1951 |
| 2,692,819 | Hasche et al. | Oct. 26, 1954 |
| 2,751,424 | Hasche | June 19, 1956 |
| 2,752,405 | Happel et al. | June 26, 1956 |
| 2,755,321 | Hasche | July 17, 1956 |
| 2,789,149 | Bogart et al. | Apr. 16, 1957 |
| 2,866,836 | Begley et al. | Dec. 30, 1958 |